United States Patent
Eisen (10) Patent No.: US 11,238,456 B2
(45) Date of Patent: *Feb. 1, 2022

(54) KEYSTROKE ANALYSIS

(71) Applicant: The 41st Parameter, Inc., Scottsdale, AZ (US)

(72) Inventor: Ori Eisen, Scottsdale, AZ (US)

(73) Assignee: The 41st Parameter, Inc., Scottsdale, AZ (US)

( * ) Notice: Subject to any disclaimer, the term of this patent is extended or adjusted under 35 U.S.C. 154(b) by 133 days.

This patent is subject to a terminal disclaimer.

(21) Appl. No.: 16/570,975

(22) Filed: Sep. 13, 2019

(65) Prior Publication Data

US 2020/0034845 A1   Jan. 30, 2020

Related U.S. Application Data

(63) Continuation of application No. 15/204,654, filed on Jul. 7, 2016, now Pat. No. 10,453,066, which is a
(Continued)

(51) Int. Cl.
*G06F 21/00* (2013.01)
*G06Q 20/40* (2012.01)
(Continued)

(52) U.S. Cl.
CPC ....... *G06Q 20/4016* (2013.01); *G06F 3/0233* (2013.01); *G06Q 30/06* (2013.01); *G06Q 40/00* (2013.01)

(58) Field of Classification Search
CPC .................................................. G06Q 20/382
(Continued)

(56) References Cited

U.S. PATENT DOCUMENTS

| 4,801,924 A | 1/1989 | Burgmann et al. |
| 4,805,222 A * | 2/1989 | Young .................. G06F 21/316 340/5.51 |

(Continued)

FOREIGN PATENT DOCUMENTS

| EP | 0 418 144 | 3/1991 |
| EP | 0 645 692 | 3/1995 |

(Continued)

OTHER PUBLICATIONS

The Nightmare. Secrets of a Super Hacker. (1994). Retrieved online May 29, 2019. http://67.225.133.110/~gbpprorg/2600/Secrets_of_a_Super_Hacker.pdf (Year: 1994).*

(Continued)

*Primary Examiner* — James A Reagan
(74) *Attorney, Agent, or Firm* — Knobbe, Martens, Olson & Bear, LLP (57) ABSTRACT

A system, method and device for detecting keystroke entries in a field entered by keyboard in connection with an online transaction that may be fraudulent or erroneous. A score can be assigned to a keystroke based upon its distance from another keystroke. The scores of keystrokes in a string can be summed to obtain a string score. The string score can be normalized by dividing the string score by the number of keystrokes summed to obtain the normalized string score. A risk of fraud or error can be determined based upon the value of the normalized string score in comparison to a predetermined value.

20 Claims, 1 Drawing Sheet

Related U.S. Application Data continuation of application No. 10/612,375, filed on Jul. 1, 2003, now Pat. No. 9,412,123.

(51) Int. Cl.
*G06Q 30/06* (2012.01)
*G06Q 40/00* (2012.01)
*G06F 3/023* (2006.01)

(58) Field of Classification Search
USPC .................................................. 705/50–79
See application file for complete search history.

(56) References Cited

U.S. PATENT DOCUMENTS

| | | | |
|---|---|---|---|
| 4,912,761 A | 3/1990 | Tan et al. | |
| 4,924,387 A | 5/1990 | Jeppesen | |
| 5,184,849 A | 2/1993 | Taylor | |
| 5,491,735 A | 2/1996 | Hsieh | |
| 5,519,827 A | 5/1996 | Mizushima | |
| 5,521,907 A | 5/1996 | Ennis, Jr. | |
| 5,557,686 A * | 9/1996 | Brown ..................... G07C 9/33 | |
| | | | 382/115 |
| 5,583,380 A | 12/1996 | Larsen et al. | |
| 5,627,886 A | 5/1997 | Bowman | |
| 5,679,940 A | 10/1997 | Templeton et al. | |
| 5,721,765 A | 2/1998 | Smith | |
| 5,724,424 A | 3/1998 | Giffor | |
| 5,748,740 A | 5/1998 | Curry et al. | |
| 5,748,780 A | 5/1998 | Stolfo et al. | |
| 5,764,275 A | 6/1998 | Lappington et al. | |
| 5,802,156 A | 9/1998 | Felger | |
| 5,819,226 A | 10/1998 | Gopinathan et al. | |
| 5,864,620 A | 1/1999 | Pettitt | |
| 5,884,289 A | 3/1999 | Anderson et al. | |
| 5,886,334 A | 3/1999 | D'Entremont | |
| 5,892,900 A | 4/1999 | Ginter et al. | |
| 5,894,510 A | 4/1999 | Felger | |
| 5,899,980 A | 5/1999 | Wilf et al. | |
| 5,903,646 A | 5/1999 | Rackman | |
| 5,903,721 A | 5/1999 | Sixtus | |
| 5,933,480 A | 8/1999 | Felger | |
| 5,960,069 A | 9/1999 | Felger | |
| 6,009,523 A | 12/1999 | Owaki et al. | |
| 6,029,154 A | 2/2000 | Pettitt | |
| 6,029,159 A | 2/2000 | Zorba et al. | |
| 6,062,474 A | 5/2000 | Kroll | |
| 6,078,907 A | 6/2000 | Lamm | |
| 6,092,053 A | 7/2000 | Boesch et al. | |
| 6,094,643 A | 7/2000 | Anderson et al. | |
| 6,105,012 A | 8/2000 | Chang et al. | |
| 6,112,240 A | 8/2000 | Pogue et al. | |
| 6,148,407 A | 11/2000 | Aucsmith | |
| 6,151,593 A | 11/2000 | Cho et al. | |
| 6,163,604 A | 12/2000 | Baulier et al. | |
| 6,163,771 A | 12/2000 | Walker et al. | |
| 6,164,528 A | 12/2000 | Hills et al. | |
| 6,205,436 B1 | 3/2001 | Rosenberg et al. | |
| 6,209,104 B1 | 3/2001 | Jalili | |
| 6,216,153 B1 | 4/2001 | Vortriede | |
| 6,223,289 B1 | 4/2001 | Wall et al. | |
| 6,282,276 B1 | 8/2001 | Felger | |
| 6,295,605 B1 | 9/2001 | Dockter et al. | |
| 6,327,384 B1 | 12/2001 | Hirao et al. | |
| 6,330,546 B1 | 12/2001 | Gopinathan et al. | |
| 6,370,648 B1 | 4/2002 | Diep | |
| 6,405,922 B1 | 6/2002 | Kroll | |
| 6,442,529 B1 | 8/2002 | Krishan et al. | |
| 6,442,692 B1 * | 8/2002 | Zilberman ............ G06F 21/316 | |
| | | | 713/184 |
| 6,457,021 B1 | 9/2002 | Berkowitz et al. | |
| 6,480,710 B1 | 11/2002 | Laybourn et al. | |
| 6,509,847 B1 | 1/2003 | Anderson | |
| 6,523,019 B1 | 2/2003 | Borthwick | |
| 6,546,493 B1 | 4/2003 | Magdych et al. | |
| 6,553,108 B1 | 4/2003 | Felger | |
| 6,560,455 B2 | 5/2003 | Amin et al. | |
| 6,567,099 B1 | 5/2003 | Dawson | |
| 6,597,775 B2 | 7/2003 | Lawyer et al. | |
| 6,646,765 B1 | 11/2003 | Barker et al. | |
| 6,678,666 B1 | 1/2004 | Boulware | |
| 6,687,390 B2 | 2/2004 | Avni et al. | |
| 6,687,696 B2 | 2/2004 | Hofmann et al. | |
| 6,689,055 B1 | 2/2004 | Mullen et al. | |
| 6,718,363 B1 | 4/2004 | Ponte | |
| 6,745,333 B1 | 6/2004 | Thomsen | |
| 6,803,920 B2 | 10/2004 | Gossett et al. | |
| 6,804,624 B2 | 10/2004 | Silverman | |
| 6,850,606 B2 | 2/2005 | Lawyer et al. | |
| 6,892,307 B1 | 5/2005 | Wood et al. | |
| 6,895,507 B1 | 5/2005 | Tepler | |
| 6,895,514 B1 * | 5/2005 | Kermani ............... G06F 21/316 | |
| | | | 726/19 |
| 6,898,709 B1 | 5/2005 | Teppler | |
| 6,908,030 B2 | 6/2005 | Rajasekaran et al. | |
| 6,937,569 B1 | 8/2005 | Sarkar et al. | |
| 6,947,978 B2 | 9/2005 | Huffman | |
| 6,954,532 B1 | 10/2005 | Handley et al. | |
| 6,957,185 B1 | 10/2005 | Labaton | |
| 6,957,339 B2 | 10/2005 | Shinzaki | |
| 7,002,712 B2 | 2/2006 | Barker et al. | |
| 7,003,670 B2 | 2/2006 | Heaven et al. | |
| 7,007,174 B2 | 2/2006 | Wheeler et al. | |
| 7,013,001 B1 | 3/2006 | Felger | |
| 7,027,800 B2 | 4/2006 | Haumont et al. | |
| 7,039,505 B1 | 5/2006 | Southard et al. | |
| 7,039,699 B1 | 5/2006 | Narin et al. | |
| 7,043,640 B2 | 5/2006 | Pritchard et al. | |
| 7,089,310 B1 | 8/2006 | Ellerman et al. | |
| 7,089,585 B1 | 8/2006 | Dharmarajan | |
| 7,096,192 B1 | 8/2006 | Pettitt | |
| 7,100,049 B2 | 8/2006 | Gasparini et al. | |
| 7,103,570 B1 | 9/2006 | Morea et al. | |
| 7,103,668 B1 | 9/2006 | Corley et al. | |
| 7,120,590 B1 | 10/2006 | Eisen et al. | |
| 7,130,858 B2 | 10/2006 | Ciaramitaro et al. | |
| 7,143,095 B2 | 11/2006 | Barrett et al. | |
| 7,158,622 B2 | 1/2007 | Lawyer et al. | |
| 7,165,051 B2 | 1/2007 | Ronning et al. | |
| 7,174,454 B2 | 2/2007 | Roskind | |
| 7,191,467 B1 | 3/2007 | Dujari et al. | |
| 7,197,646 B2 | 3/2007 | Fritz et al. | |
| 7,206,938 B2 * | 4/2007 | Bender ................. G06F 21/316 | |
| | | | 713/186 |
| 7,221,949 B2 | 5/2007 | Clough | |
| 7,225,974 B2 | 6/2007 | Yamauchi | |
| 7,237,717 B1 | 7/2007 | Rao et al. | |
| 7,249,093 B1 | 7/2007 | King | |
| 7,251,624 B1 | 7/2007 | Lee et al. | |
| 7,260,837 B2 * | 8/2007 | Abraham ........... G06Q 20/3821 | |
| | | | 726/4 |
| 7,263,492 B1 | 8/2007 | Suresh et al. | |
| 7,263,506 B2 | 8/2007 | Lee et al. | |
| 7,272,610 B2 | 9/2007 | Torres | |
| 7,272,728 B2 | 9/2007 | Pierson et al. | |
| 7,292,723 B2 | 11/2007 | Tedesco et al. | |
| 7,293,096 B1 | 11/2007 | Foltak et al. | |
| 7,296,088 B1 | 11/2007 | Padmanabhan et al. | |
| 7,328,216 B2 | 2/2008 | Hofmann et al. | |
| 7,330,824 B1 | 2/2008 | Kanojia et al. | |
| 7,330,871 B2 | 2/2008 | Barber | |
| 7,340,045 B2 | 3/2008 | Felger | |
| 7,346,551 B2 | 3/2008 | Pe Jimenez et al. | |
| 7,346,775 B2 | 3/2008 | Gasparinl et al. | |
| 7,349,955 B1 | 3/2008 | Korb et al. | |
| 7,359,962 B2 | 4/2008 | Willebeek-LeMair et al. | |
| 7,363,170 B2 | 4/2008 | Seul et al. | |
| 7,373,669 B2 | 5/2008 | Eisen | |
| 7,376,618 B1 | 5/2008 | Anderson et al. | |
| 7,379,891 B1 | 5/2008 | Donner et al. | |
| 7,386,892 B2 * | 6/2008 | Gilfix ..................... G06F 21/31 | |
| | | | 713/184 |
| 7,404,087 B2 | 6/2008 | Teunen | |
| 7,401,082 B2 | 7/2008 | Keene et al. | |

(56) References Cited

U.S. PATENT DOCUMENTS

| | | | |
|---|---|---|---|
| 7,403,922 B1 | 7/2008 | Lewis et al. |
| 7,406,441 B2 | 7/2008 | Kimura et al. |
| 7,428,587 B2 | 9/2008 | Rowland et al. |
| 7,436,780 B2 | 10/2008 | Stephens |
| 7,438,226 B2 | 10/2008 | Helsper et al. |
| 7,447,494 B2 | 11/2008 | Law et al. |
| 7,451,487 B2 | 11/2008 | Oliver et al. |
| 7,457,401 B2 | 11/2008 | Lawyer et al. |
| 7,457,823 B2 | 11/2008 | Shraim et al. |
| 7,475,242 B2 | 1/2009 | Baird et al. |
| 7,478,182 B2 | 1/2009 | Schweig |
| 7,487,350 B2 | 2/2009 | Utin |
| 7,496,752 B2 | 2/2009 | Yamaguchi et al. |
| 7,497,374 B2 | 3/2009 | Helsper et al. |
| 7,502,610 B2 | 3/2009 | Maher |
| 7,502,933 B2 | 3/2009 | Jakobsson et al. |
| 7,526,796 B2 | 4/2009 | Lulich et al. |
| 7,543,740 B2 | 6/2009 | Greene et al. |
| 7,552,090 B1 | 6/2009 | Barber |
| 7,555,458 B1 | 6/2009 | Felger |
| 7,562,221 B2 | 7/2009 | Nyström et al. |
| 7,577,620 B1 | 8/2009 | Donner |
| 7,581,112 B2 | 8/2009 | Brown et al. |
| 7,606,560 B2 | 10/2009 | Labrou et al. |
| 7,630,924 B1 | 12/2009 | Collins et al. |
| 7,631,808 B2 | 12/2009 | Kundu et al. |
| 7,657,626 B1 | 2/2010 | Zwicky |
| 7,660,902 B2 | 2/2010 | Graham et al. |
| 7,665,140 B2 | 2/2010 | Oliver et al. |
| 7,665,658 B2 | 2/2010 | Fields |
| 7,673,793 B2 | 3/2010 | Greene et al. |
| 7,685,629 B1 | 3/2010 | White et al. |
| 7,698,743 B2 | 4/2010 | Ohmori et al. |
| 7,708,200 B2 | 5/2010 | Helsper et al. |
| 7,711,846 B2 | 5/2010 | Padmanabhan et al. |
| 7,735,141 B1 | 6/2010 | Noel et al. |
| 7,739,402 B2 | 6/2010 | Roese et al. |
| 7,739,512 B2 | 6/2010 | Hawkes |
| 7,743,409 B2 | 6/2010 | Gonzalez et al. |
| 7,752,084 B2 | 7/2010 | Pettitt |
| 7,756,783 B2 | 7/2010 | Crooks |
| 7,761,379 B2 | 7/2010 | Zoldi et al. |
| 7,778,846 B2 | 8/2010 | Suresh et al. |
| 7,813,937 B1 | 10/2010 | Pathria et al. |
| 7,813,944 B1 | 10/2010 | Luk et al. |
| 7,849,029 B2 | 12/2010 | Crooks et al. |
| 7,849,307 B2 | 12/2010 | Roskind |
| 7,853,526 B2 | 12/2010 | Milana |
| 7,853,533 B2 * | 12/2010 | Eisen .............. G06Q 20/3674 705/64 |
| 7,856,372 B2 | 12/2010 | Ullah |
| 7,860,783 B2 | 12/2010 | Yang et al. |
| 7,861,260 B2 | 12/2010 | Shkedi |
| 7,865,427 B2 | 1/2011 | Wright et al. |
| 7,882,217 B2 | 2/2011 | Katzir |
| 7,908,223 B2 | 3/2011 | Klein et al. |
| 7,908,645 B2 | 3/2011 | Varghese et al. |
| 7,930,285 B2 * | 4/2011 | Abraham ............ H04L 43/0876 707/706 |
| 7,933,984 B1 | 4/2011 | Smith et al. |
| 7,937,467 B2 | 5/2011 | Barber |
| 7,940,929 B1 | 5/2011 | Sengupta |
| 7,945,494 B2 | 5/2011 | Williams |
| 7,945,515 B2 | 5/2011 | Zoldi et al. |
| 7,949,564 B1 | 5/2011 | Hughes et al. |
| 7,958,029 B1 | 6/2011 | Bobich et al. |
| 7,958,246 B2 | 6/2011 | Barber |
| 7,961,857 B2 | 6/2011 | Zoldi et al. |
| 7,970,701 B2 | 6/2011 | Lewis et al. |
| 7,983,691 B1 | 7/2011 | Wong et al. |
| 7,991,716 B2 | 8/2011 | Crooks et al. |
| 7,995,996 B2 | 8/2011 | Link, II et al. |
| 8,001,376 B2 | 8/2011 | Utin |
| 8,001,597 B2 | 8/2011 | Crooks |
| 8,015,614 B2 | 9/2011 | Matsuzaki et al. |
| 8,015,921 B2 | 9/2011 | Leppanen et al. |
| 8,019,678 B2 | 9/2011 | Wright et al. |
| 8,020,763 B1 | 9/2011 | Kowalchyk et al. |
| 8,024,266 B1 | 9/2011 | Barber |
| 8,025,220 B2 | 9/2011 | Zoldi et al. |
| 8,027,439 B2 | 9/2011 | Zoldi et al. |
| 8,032,448 B2 | 10/2011 | Anderson et al. |
| 8,037,097 B2 | 10/2011 | Guo et al. |
| 8,037,511 B1 | 10/2011 | Lundy et al. |
| 8,041,597 B2 | 10/2011 | Li et al. |
| 8,042,164 B2 | 10/2011 | Sheynblat et al. |
| 8,046,271 B2 | 10/2011 | Jimenez et al. |
| 8,060,922 B2 | 11/2011 | Crichton et al. |
| 8,065,233 B2 | 11/2011 | Lee et al. |
| 8,090,648 B2 | 1/2012 | Zoldi et al. |
| 8,108,378 B2 | 1/2012 | Ott, IV et al. |
| 8,121,962 B2 | 2/2012 | Vaiciulis et al. |
| 8,122,082 B2 | 2/2012 | Klein |
| 8,126,816 B2 | 2/2012 | Mu et al. |
| 8,131,615 B2 | 3/2012 | Diev et al. |
| 8,140,689 B2 | 3/2012 | Barber |
| 8,141,148 B2 | 3/2012 | Thomas et al. |
| 8,145,560 B2 | 3/2012 | Kulkarni et al. |
| 8,145,762 B2 | 3/2012 | Barber |
| 8,150,968 B2 | 4/2012 | Barber |
| 8,151,327 B2 | 4/2012 | Eisen |
| 8,166,068 B2 | 4/2012 | Stevens |
| 8,175,897 B2 | 5/2012 | Lee et al. |
| 8,176,178 B2 | 5/2012 | Thomas et al. |
| 8,180,686 B2 | 5/2012 | Ryu et al. |
| 8,181,015 B2 | 5/2012 | Roskind |
| 8,185,953 B2 | 5/2012 | Rothstein et al. |
| 8,190,513 B2 | 5/2012 | Felger |
| 8,190,529 B2 | 5/2012 | Abe et al. |
| 8,191,148 B2 | 5/2012 | Oliver et al. |
| 8,201,099 B1 | 6/2012 | Osbourn et al. |
| 8,204,833 B2 | 6/2012 | Mu et al. |
| 8,209,744 B2 | 6/2012 | Zhu et al. |
| 8,209,760 B1 | 6/2012 | Hardman |
| 8,213,898 B2 | 7/2012 | Choti et al. |
| 8,214,232 B2 | 7/2012 | Tyler et al. |
| 8,214,285 B2 | 7/2012 | Hu et al. |
| 8,219,415 B2 | 7/2012 | Tyler et al. |
| 8,224,348 B2 | 7/2012 | Bolon et al. |
| 8,229,844 B2 | 7/2012 | Felger |
| 8,250,631 B2 | 8/2012 | Iyengar et al. |
| 8,266,295 B2 | 9/2012 | Klein et al. |
| 8,271,891 B1 | 9/2012 | Osbourn et al. |
| 8,280,833 B2 | 10/2012 | Miltonberger |
| 8,290,838 B1 | 10/2012 | Thakur et al. |
| 8,295,898 B2 | 10/2012 | Ashfield et al. |
| 8,296,228 B1 | 10/2012 | Kloor |
| 8,296,229 B1 | 10/2012 | Yellin et al. |
| 8,296,245 B2 | 10/2012 | Barber et al. |
| 8,296,250 B2 | 10/2012 | Crooks et al. |
| 8,306,933 B2 | 11/2012 | Kawai et al. |
| 8,307,430 B1 | 11/2012 | Chen et al. |
| 8,311,907 B2 | 11/2012 | Klein et al. |
| 8,321,269 B2 | 11/2012 | Linden et al. |
| 8,326,759 B2 | 12/2012 | Hammad |
| 8,326,760 B2 | 12/2012 | Ma et al. |
| 8,326,763 B2 | 12/2012 | Zuili |
| 8,332,338 B2 | 12/2012 | Vaiciulis et al. |
| 8,332,522 B2 | 12/2012 | Barber |
| 8,370,253 B1 | 2/2013 | Grossman et al. |
| 8,370,638 B2 | 2/2013 | Duane et al. |
| 8,380,831 B2 | 2/2013 | Barber |
| 8,392,987 B2 | 3/2013 | Sasamura et al. |
| 8,407,112 B2 | 3/2013 | Walter |
| 8,407,798 B1 | 3/2013 | Lotem et al. |
| 8,417,587 B2 | 4/2013 | Jimenez et al. |
| 8,423,458 B2 | 4/2013 | Barber |
| 8,424,061 B2 | 4/2013 | Rosenor |
| 8,429,070 B2 | 4/2013 | Hu et al. |
| 8,438,134 B2 | 5/2013 | Wang et al. |
| 8,438,184 B1 | 5/2013 | Wang |
| 8,443,202 B2 | 5/2013 | White et al. |
| 8,452,715 B2 | 5/2013 | Barber |
| 8,453,226 B2 | 5/2013 | Hammad |

(56) References Cited

U.S. PATENT DOCUMENTS

| | | | |
|---|---|---|---|
| 8,462,161 B1 | 6/2013 | Barber |
| 8,464,290 B2 | 6/2013 | Beyda et al. |
| 8,468,582 B2 | 6/2013 | Kuang et al. |
| 8,484,470 B2 | 7/2013 | Sakakihara et al. |
| 8,495,714 B2 | 7/2013 | Jones et al. |
| 8,516,439 B2 | 8/2013 | Brass et al. |
| 8,539,070 B2 | 9/2013 | Barber |
| 8,543,522 B2 | 9/2013 | Ryman-Tubb et al. |
| 8,548,137 B2 | 10/2013 | Zoldi et al. |
| 8,559,607 B2 | 10/2013 | Zoldi et al. |
| 8,567,669 B2 | 10/2013 | Griegel et al. |
| 8,588,816 B2 | 11/2013 | Collins |
| 8,601,109 B2 | 12/2013 | Johannsen |
| 8,611,856 B2 | 12/2013 | Yan et al. |
| 8,612,854 B2 | 12/2013 | Eisen et al. |
| 8,620,942 B1 | 12/2013 | Hoffman et al. |
| 8,660,539 B2 | 2/2014 | Khambete et al. |
| 8,676,684 B2 | 3/2014 | Newman et al. |
| 8,683,561 B2 | 3/2014 | Utin |
| 8,688,543 B2 | 4/2014 | Dominquez |
| 8,701,168 B2 | 4/2014 | Sastry et al. |
| 8,701,170 B1 | 4/2014 | Barber |
| 8,751,815 B2 | 6/2014 | Lunde et al. |
| 8,762,283 B2 | 6/2014 | Gerber et al. |
| 8,762,574 B2 | 6/2014 | Barber |
| 8,763,113 B2 | 6/2014 | Thomas et al. |
| 8,776,225 B2 | 7/2014 | Pierson et al. |
| 8,779,981 B2 | 7/2014 | Eisen et al. |
| 8,781,975 B2 | 7/2014 | Bennett et al. |
| 8,782,783 B2 | 7/2014 | Thomas et al. |
| 8,799,458 B2 | 8/2014 | Barber |
| 8,817,984 B2 | 8/2014 | Miller et al. |
| 8,826,393 B2 | 9/2014 | Eisen |
| 8,838,478 B2 | 9/2014 | Kretz et al. |
| 8,838,967 B1 | 9/2014 | Mills et al. |
| 8,862,514 B2 | 10/2014 | Eisen |
| 8,862,526 B2 | 10/2014 | Miltonberger |
| 8,874,735 B2 | 10/2014 | Barber |
| 8,881,288 B1 | 11/2014 | Levy et al. |
| 8,938,671 B2 | 1/2015 | Eisen et al. |
| 8,954,560 B2 | 2/2015 | Johannsen |
| 8,966,276 B2 | 2/2015 | Nanopoulos et al. |
| 9,038,153 B2 | 5/2015 | Barber |
| 9,060,012 B2 | 6/2015 | Eisen |
| 9,075,896 B2 | 7/2015 | Barber |
| 9,083,735 B2 | 7/2015 | Reumann et al. |
| 9,098,617 B1 | 8/2015 | Pauley, Jr. et al. |
| 9,112,850 B1 | 8/2015 | Eisen |
| 9,118,646 B2 | 8/2015 | Pierson et al. |
| 9,172,691 B2 | 10/2015 | Barber |
| 9,177,293 B1 | 11/2015 | Gagnon et al. |
| 9,183,567 B2 | 11/2015 | Barber |
| 9,191,370 B2 | 11/2015 | Barber et al. |
| 9,196,004 B2 | 11/2015 | Eisen |
| 9,203,837 B2 | 12/2015 | Pierson et al. |
| 9,294,448 B2 | 3/2016 | Miller et al. |
| 9,298,677 B2 | 3/2016 | Tollinger et al. |
| 9,332,020 B2 | 5/2016 | Thomas et al. |
| 9,361,597 B2 | 6/2016 | Britton et al. |
| 9,378,500 B2 | 6/2016 | Jimenez et al. |
| 9,390,384 B2 | 7/2016 | Eisen |
| 9,396,331 B2 | 7/2016 | Eisen et al. |
| 9,412,123 B2 * | 8/2016 | Eisen ............ G06Q 30/06 |
| 9,477,968 B2 | 10/2016 | Barber |
| 9,514,248 B1 | 12/2016 | Guan et al. |
| 9,521,161 B2 | 12/2016 | Reumann et al. |
| 9,521,551 B2 | 12/2016 | Eisen et al. |
| 9,559,852 B2 | 1/2017 | Miller et al. |
| 9,603,016 B1 | 3/2017 | Mills et al. |
| 9,633,201 B1 | 4/2017 | Katz |
| 9,699,164 B2 | 7/2017 | Barber |
| 9,702,961 B2 | 7/2017 | Shields |
| 9,703,983 B2 | 7/2017 | Eisen et al. |
| 9,712,497 B2 | 7/2017 | Barber et al. |
| 9,722,968 B2 | 8/2017 | Barber |
| 9,754,256 B2 | 9/2017 | Britton et al. |
| 9,754,311 B2 | 9/2017 | Eisen |
| 9,781,151 B1 | 10/2017 | McCorkendale et al. |
| 9,785,973 B2 | 10/2017 | Tollinger et al. |
| 9,916,393 B2 | 3/2018 | Barber |
| 9,948,629 B2 | 4/2018 | Eisen |
| 9,990,631 B2 | 6/2018 | Eisen |
| 10,021,099 B2 | 7/2018 | Eisen et al. |
| 10,037,529 B2 | 7/2018 | Barber |
| 10,089,679 B2 | 10/2018 | Eisen |
| 10,091,312 B1 | 10/2018 | Khanwalkar et al. |
| 10,290,017 B2 | 5/2019 | Traasdahl et al. |
| 10,305,880 B2 | 5/2019 | Barber |
| 10,339,306 B1 | 7/2019 | Katz |
| 10,341,344 B2 | 7/2019 | Eisen et al. |
| 10,395,252 B2 | 8/2019 | Eisen |
| 10,402,854 B2 | 9/2019 | Barber |
| 10,417,637 B2 | 9/2019 | Eisen |
| 10,425,379 B2 | 9/2019 | Barber |
| 10,453,066 B2 | 10/2019 | Eisen |
| 10,535,093 B2 | 1/2020 | Eisen |
| 10,616,201 B2 | 4/2020 | Eisen |
| 10,642,899 B2 | 5/2020 | Barber |
| 10,679,216 B2 | 6/2020 | Barber |
| 10,691,751 B2 | 6/2020 | Atlas et al. |
| 10,726,151 B2 | 7/2020 | Eisen et al. |
| 10,728,350 B1 | 7/2020 | Khanwalkar et al. |
| 10,754,913 B2 | 8/2020 | Liodden et al. |
| 10,853,813 B2 | 12/2020 | Eisen |
| 10,862,889 B2 | 12/2020 | Eisen et al. |
| 10,902,327 B1 | 1/2021 | Yalov et al. |
| 10,999,298 B2 | 5/2021 | Eisen |
| 11,010,468 B1 | 5/2021 | Katz |
| 2001/0001877 A1 * | 5/2001 | French ............ G06Q 20/40 |
| | | 713/182 |
| 2001/0011243 A1 | 8/2001 | Dembo et al. |
| 2001/0011304 A1 | 8/2001 | Wesigner et al. |
| 2001/0016840 A1 | 8/2001 | Hijikata et al. |
| 2001/0016876 A1 | 8/2001 | Kurth et al. |
| 2001/0018739 A1 | 8/2001 | Anderson et al. |
| 2001/0034712 A1 | 10/2001 | Colvin |
| 2001/0046096 A1 | 11/2001 | Worden |
| 2002/0035622 A1 | 3/2002 | Barber |
| 2002/0041328 A1 | 4/2002 | LeCompte et al. |
| 2002/0046157 A1 | 4/2002 | Solomon |
| 2002/0052852 A1 | 5/2002 | Bozeman |
| 2002/0056042 A1 | 5/2002 | van der Kaay et al. |
| 2002/0073046 A1 | 6/2002 | David |
| 2002/0073327 A1 | 6/2002 | Vellandi |
| 2002/0083079 A1 | 6/2002 | Meier et al. |
| 2002/0112171 A1 | 8/2002 | Ginter et al. |
| 2002/0128917 A1 | 9/2002 | Grounds |
| 2002/0138335 A1 | 9/2002 | Palmer et al. |
| 2002/0138577 A1 | 9/2002 | Teng et al. |
| 2002/0153424 A1 | 10/2002 | Li |
| 2002/0156724 A1 | 10/2002 | Levchin et al. |
| 2002/0156836 A1 | 10/2002 | Janosik, Jr. et al. |
| 2002/0166063 A1 | 11/2002 | Lachman et al. |
| 2002/0167965 A1 | 11/2002 | Beasley et al. |
| 2003/0002732 A1 | 1/2003 | Gossett et al. |
| 2003/0002740 A1 | 1/2003 | Melikian et al. |
| 2003/0014327 A1 | 1/2003 | Skantze |
| 2003/0033161 A1 | 2/2003 | Walker et al. |
| 2003/0033356 A1 | 2/2003 | Tran et al. |
| 2003/0070080 A1 | 4/2003 | Rosen |
| 2003/0074301 A1 | 4/2003 | Solomon |
| 2003/0076242 A1 | 4/2003 | Burns et al. |
| 2003/0105707 A1 | 6/2003 | Audebert et al. |
| 2003/0105854 A1 | 6/2003 | Thorsteinsson et al. |
| 2003/0113033 A1 | 6/2003 | Huang |
| 2003/0115334 A1 | 6/2003 | Bhat et al. |
| 2003/0115481 A1 | 6/2003 | Baird et al. |
| 2003/0120543 A1 | 6/2003 | Carey |
| 2003/0120586 A1 | 6/2003 | Litty |
| 2003/0140258 A1 | 7/2003 | Nelson et al. |
| 2003/0140283 A1 | 7/2003 | Nishio |
| 2003/0154214 A1 | 8/2003 | Tu et al. |
| 2003/0158751 A1 | 8/2003 | Suresh et al. |
| 2003/0163359 A1 | 8/2003 | Kanesaka |

(56) References Cited

U.S. PATENT DOCUMENTS

| | | |
|---|---|---|
| 2003/0163398 A1 | 8/2003 | Yoshioka et al. |
| 2003/0163413 A1 | 8/2003 | Wiczkowski |
| 2003/0172036 A1 | 9/2003 | Feigenbaum |
| 2003/0182551 A1 | 9/2003 | Frantz et al. |
| 2003/0208684 A1 | 11/2003 | Camacho et al. |
| 2003/0212618 A1 | 11/2003 | Keyes et al. |
| 2003/0233553 A1 | 12/2003 | Parks et al. |
| 2003/0237000 A1 | 12/2003 | Denton et al. |
| 2004/0001044 A1 | 1/2004 | Luciani et al. |
| 2004/0004733 A1 | 1/2004 | Barker et al. |
| 2004/0006553 A1 | 1/2004 | de Vries et al. |
| 2004/0010682 A1 | 1/2004 | Foster et al. |
| 2004/0027385 A1 | 2/2004 | Rekimoto et al. |
| 2004/0030912 A1 | 2/2004 | Merkle, Jr. et al. |
| 2004/0034794 A1 | 2/2004 | Mayer et al. |
| 2004/0066023 A1 | 4/2004 | Joseph |
| 2004/0073809 A1 | 4/2004 | Wing Keong |
| 2004/0088313 A1 | 5/2004 | Torres |
| 2004/0098618 A1 | 5/2004 | Kim et al. |
| 2004/0105431 A1 | 6/2004 | Monjas-Llorente et al. |
| 2004/0111621 A1 | 6/2004 | Himberger et al. |
| 2004/0111632 A1 | 6/2004 | Halperin |
| 2004/0117321 A1 | 6/2004 | Sancho |
| 2004/0139008 A1 | 7/2004 | Mascavaage, III |
| 2004/0153644 A1 | 8/2004 | McCorkendale et al. |
| 2004/0159699 A1 | 8/2004 | Nelson et al. |
| 2004/0166857 A1 | 8/2004 | Shim et al. |
| 2004/0171381 A1 | 9/2004 | Inselberg |
| 2004/0181598 A1 | 9/2004 | Paya et al. |
| 2004/0187023 A1 | 9/2004 | Alagna et al. |
| 2004/0203750 A1 | 10/2004 | Cowdrey et al. |
| 2004/0230820 A1 | 11/2004 | Hui Hsu et al. |
| 2004/0236696 A1 | 11/2004 | Aoki et al. |
| 2004/0236702 A1 | 11/2004 | Fink et al. |
| 2004/0254890 A1 | 12/2004 | Sancho et al. |
| 2004/0260876 A1 | 12/2004 | Singh et al. |
| 2004/0260922 A1 | 12/2004 | Goodman et al. |
| 2005/0008148 A1 | 1/2005 | Jacobson |
| 2005/0015601 A1 | 1/2005 | Tabi |
| 2005/0022020 A1 | 1/2005 | Fremberg et al. |
| 2005/0033653 A1 | 2/2005 | Eisenberg et al. |
| 2005/0033703 A1 | 2/2005 | Holdsworth |
| 2005/0039034 A1 | 2/2005 | Doyle et al. |
| 2005/0039219 A1 | 2/2005 | Cooper et al. |
| 2005/0074015 A1 | 4/2005 | Chari et al. |
| 2005/0076230 A1 | 4/2005 | Redenbaugh et al. |
| 2005/0085931 A1 | 4/2005 | Willeby |
| 2005/0097320 A1 | 5/2005 | Golan et al. |
| 2005/0108177 A1 | 5/2005 | Sancho |
| 2005/0111054 A1 | 5/2005 | Umeda |
| 2005/0113092 A1 | 5/2005 | Coppinger et al. |
| 2005/0131826 A1 | 6/2005 | Cook |
| 2005/0185225 A1 | 8/2005 | Brawn et al. |
| 2005/0187883 A1* | 8/2005 | Bishop ............... G06Q 20/027 705/67 |
| 2005/0188423 A1 | 8/2005 | Motsinger et al. |
| 2005/0204159 A1 | 9/2005 | Davis et al. |
| 2005/0210533 A1 | 9/2005 | Copeland et al. |
| 2005/0246551 A1 | 11/2005 | Dondl et al. |
| 2005/0278542 A1 | 12/2005 | Pierson et al. |
| 2006/0008779 A1 | 1/2006 | Shand et al. |
| 2006/0010072 A1 | 1/2006 | Eisen |
| 2006/0026669 A1 | 2/2006 | Zakas |
| 2006/0031938 A1 | 2/2006 | Choi |
| 2006/0048211 A1 | 3/2006 | Pierson et al. |
| 2006/0064346 A1 | 3/2006 | Steenstra et al. |
| 2006/0069619 A1 | 3/2006 | Walker et al. |
| 2006/0075492 A1 | 4/2006 | Golan et al. |
| 2006/0080263 A1 | 4/2006 | Willis et al. |
| 2006/0126829 A1 | 6/2006 | Lai |
| 2006/0130132 A1 | 6/2006 | Dharmarajan |
| 2006/0136294 A1 | 6/2006 | Linden et al. |
| 2006/0155985 A1 | 7/2006 | Canard et al. |
| 2006/0161501 A1 | 7/2006 | Waserstein et al. |
| 2006/0176984 A1 | 8/2006 | Lee et al. |
| 2006/0190331 A1 | 8/2006 | Tollinger et al. |
| 2006/0190489 A1 | 8/2006 | Vohariwatt et al. |
| 2006/0200855 A1 | 9/2006 | Willis |
| 2006/0200856 A1 | 9/2006 | Salowey et al. |
| 2006/0224898 A1 | 10/2006 | Ahmed |
| 2006/0237531 A1 | 10/2006 | Heffez et al. |
| 2006/0253327 A1 | 11/2006 | Morris et al. |
| 2006/0253328 A1 | 11/2006 | Kohli et al. |
| 2006/0264202 A1 | 11/2006 | Hagmeier et al. |
| 2006/0281541 A1 | 12/2006 | Nguyen et al. |
| 2006/0282660 A1 | 12/2006 | Varghese et al. |
| 2006/0284838 A1 | 12/2006 | Tsatalos et al. |
| 2006/0287902 A1 | 12/2006 | Helsper et al. |
| 2007/0011078 A1 | 1/2007 | Jain et al. |
| 2007/0026942 A1 | 2/2007 | Kinsley et al. |
| 2007/0030528 A1 | 2/2007 | Quaeler et al. |
| 2007/0038568 A1 | 2/2007 | Greene et al. |
| 2007/0043837 A1 | 2/2007 | Kruse et al. |
| 2007/0061211 A1 | 3/2007 | Ramer et al. |
| 2007/0061273 A1 | 3/2007 | Greene et al. |
| 2007/0073630 A1 | 3/2007 | Greene et al. |
| 2007/0094594 A1 | 4/2007 | Matichuk et al. |
| 2007/0097076 A1 | 5/2007 | Gross |
| 2007/0097976 A1 | 5/2007 | Wood et al. |
| 2007/0101405 A1 | 5/2007 | Engle et al. |
| 2007/0107059 A1 | 5/2007 | Chasin et al. |
| 2007/0118892 A1 | 5/2007 | Sastry et al. |
| 2007/0124246 A1 | 5/2007 | Lawyer et al. |
| 2007/0162763 A1 | 7/2007 | Bender et al. |
| 2007/0198410 A1 | 8/2007 | Labgold et al. |
| 2007/0199054 A1 | 8/2007 | Florencio et al. |
| 2007/0204044 A1 | 8/2007 | Rice et al. |
| 2007/0214151 A1 | 9/2007 | Scott et al. |
| 2007/0220594 A1 | 9/2007 | Tulsyan |
| 2007/0233599 A1 | 10/2007 | Ganesan et al. |
| 2007/0234070 A1 | 10/2007 | Horning et al. |
| 2007/0239604 A1 | 10/2007 | O'Connell et al. |
| 2007/0255821 A1 | 11/2007 | Ge et al. |
| 2007/0266257 A1 | 11/2007 | Camaisa et al. |
| 2007/0271466 A1 | 11/2007 | Mak |
| 2007/0294401 A1 | 12/2007 | Shkedi |
| 2007/0297459 A1 | 12/2007 | Cucos et al. |
| 2008/0002725 A1 | 1/2008 | Alicherry et al. |
| 2008/0005394 A1 | 1/2008 | Crooks |
| 2008/0010367 A1 | 1/2008 | Cheng et al. |
| 2008/0010678 A1 | 1/2008 | Burdette et al. |
| 2008/0015988 A1 | 1/2008 | Brown et al. |
| 2008/0021801 A1 | 1/2008 | Song et al. |
| 2008/0040653 A1 | 2/2008 | Levine |
| 2008/0040802 A1 | 2/2008 | Pierson et al. |
| 2008/0046562 A1 | 2/2008 | Butler |
| 2008/0052629 A1 | 2/2008 | Phillips et al. |
| 2008/0098222 A1 | 4/2008 | Zilberman |
| 2008/0101277 A1 | 5/2008 | Taylor |
| 2008/0104070 A1 | 5/2008 | Lonchar |
| 2008/0104672 A1 | 5/2008 | Lunde et al. |
| 2008/0104684 A1 | 5/2008 | Lunde et al. |
| 2008/0120195 A1 | 5/2008 | Shakkarwar |
| 2008/0120214 A1 | 5/2008 | Steele et al. |
| 2008/0133420 A1 | 6/2008 | Barber |
| 2008/0162200 A1 | 7/2008 | O'Sullivan et al. |
| 2008/0162202 A1 | 7/2008 | Khanna et al. |
| 2008/0162475 A1 | 7/2008 | Meggs |
| 2008/0163128 A1 | 7/2008 | Callanan et al. |
| 2008/0184355 A1 | 7/2008 | Walrath et al. |
| 2008/0184372 A1 | 7/2008 | Hoshina |
| 2008/0189790 A1 | 8/2008 | Park |
| 2008/0191007 A1 | 8/2008 | Keay |
| 2008/0201214 A1 | 8/2008 | Aaron |
| 2008/0204788 A1 | 8/2008 | Kelly et al. |
| 2008/0222706 A1 | 9/2008 | Renaud et al. |
| 2008/0235623 A1 | 9/2008 | Li |
| 2008/0239365 A1 | 10/2008 | Salgado et al. |
| 2008/0249820 A1 | 10/2008 | Pathria et al. |
| 2008/0281606 A1 | 11/2008 | Kitts |
| 2008/0281941 A1 | 11/2008 | Park et al. |
| 2008/0288299 A1 | 11/2008 | Schultz |
| 2008/0301281 A1 | 12/2008 | Wang et al. |
| 2008/0306830 A1 | 12/2008 | Lasa et al. |

(56) References Cited

U.S. PATENT DOCUMENTS

| | | |
|---|---|---|
| 2008/0313079 A1 | 12/2008 | Van Bosch et al. |
| 2008/0319774 A1 | 12/2008 | O'Sullivan et al. |
| 2008/0319841 A1 | 12/2008 | Oliver et al. |
| 2009/0018940 A1 | 1/2009 | Wang et al. |
| 2009/0024971 A1 | 1/2009 | Willner et al. |
| 2009/0044279 A1 | 2/2009 | Crawford et al. |
| 2009/0044282 A1 | 2/2009 | Govindaraju |
| 2009/0055398 A1 | 2/2009 | Zhu et al. |
| 2009/0055929 A1 | 2/2009 | Lee et al. |
| 2009/0070664 A1 | 3/2009 | Gavin et al. |
| 2009/0089869 A1 | 4/2009 | Varghese |
| 2009/0106413 A1 | 4/2009 | Salo |
| 2009/0138590 A1 | 5/2009 | Lee et al. |
| 2009/0157417 A1 | 6/2009 | Bradley et al. |
| 2009/0164269 A1 | 6/2009 | Gupta et al. |
| 2009/0177692 A1 | 7/2009 | Chagoly et al. |
| 2009/0183010 A1 | 7/2009 | Schnell et al. |
| 2009/0205031 A1 | 8/2009 | Sato et al. |
| 2009/0222308 A1 | 9/2009 | Zoldi et al. |
| 2009/0228585 A1 | 9/2009 | Kosbab et al. |
| 2009/0234738 A1 | 9/2009 | Britton et al. |
| 2009/0241174 A1 | 9/2009 | Rajan et al. |
| 2009/0260064 A1 | 10/2009 | Mcdowell et al. |
| 2009/0265773 A1 | 10/2009 | Schultz |
| 2009/0271306 A1 | 10/2009 | Pierson |
| 2009/0307141 A1 | 10/2009 | Kongalath et al. |
| 2009/0280777 A1 | 11/2009 | Doherty |
| 2009/0292568 A1 | 11/2009 | Khosravani et al. |
| 2009/0293128 A1 | 11/2009 | Lippmann et al. |
| 2009/0296907 A1 | 12/2009 | Vendrow et al. |
| 2009/0298480 A1 | 12/2009 | Khambete et al. |
| 2009/0307119 A1 | 12/2009 | Ahles et al. |
| 2009/0313134 A1 | 12/2009 | Faith et al. |
| 2010/0005013 A1 | 1/2010 | Uriarte |
| 2010/0030641 A1 | 2/2010 | Ibenforth |
| 2010/0030777 A1 | 2/2010 | Panwar et al. |
| 2010/0057623 A1 | 3/2010 | Kapur et al. |
| 2010/0057843 A1 | 3/2010 | Landsman et al. |
| 2010/0070606 A1 | 3/2010 | Shenfield et al. |
| 2010/0082972 A1 | 4/2010 | Benco et al. |
| 2010/0094767 A1 | 4/2010 | Miltonberger |
| 2010/0094768 A1 | 4/2010 | Miltonberger |
| 2010/0106611 A1 | 4/2010 | Paulsen et al. |
| 2010/0107225 A1 | 4/2010 | Spencer et al. |
| 2010/0121716 A1 | 5/2010 | Golan |
| 2010/0138299 A1 | 6/2010 | Preston et al. |
| 2010/0145960 A1 | 6/2010 | Casteel et al. |
| 2010/0153540 A1 | 6/2010 | Li et al. |
| 2010/0157848 A1 | 6/2010 | Das et al. |
| 2010/0161424 A1 | 6/2010 | Sylvain |
| 2010/0161566 A1 | 6/2010 | Adair et al. |
| 2010/0169157 A1 | 7/2010 | Muhonen et al. |
| 2010/0169192 A1 | 7/2010 | Zoldi et al. |
| 2010/0192082 A1 | 7/2010 | Sodah |
| 2010/0199332 A1 | 8/2010 | Bachmann et al. |
| 2010/0199338 A1 | 8/2010 | Craddock et al. |
| 2010/0211464 A1 | 8/2010 | Zhu et al. |
| 2010/0223105 A1 | 9/2010 | Gassewitz et al. |
| 2010/0223145 A1 | 9/2010 | Dragt |
| 2010/0228625 A1 | 9/2010 | Priyadarshan et al. |
| 2010/0228638 A1 | 9/2010 | Mikan et al. |
| 2010/0257065 A1 | 10/2010 | Gupta et al. |
| 2010/0274678 A1 | 10/2010 | Rolf et al. |
| 2010/0293094 A1 | 11/2010 | Kolkowitz et al. |
| 2010/0306827 A1 | 12/2010 | Esteve Balducci et al. |
| 2010/0321296 A1 | 12/2010 | Gross |
| 2010/0333170 A1 | 12/2010 | Cox et al. |
| 2011/0022483 A1 | 1/2011 | Hammad |
| 2011/0022517 A1 | 1/2011 | Hammad |
| 2011/0023115 A1 | 1/2011 | Wright |
| 2011/0035302 A1 | 2/2011 | Martell et al. |
| 2011/0047072 A1 | 2/2011 | Ciurea |
| 2011/0082768 A1 | 4/2011 | Eisen |
| 2011/0112901 A1 | 5/2011 | Fried et al. |
| 2011/0161228 A1 | 6/2011 | Suzuki et al. |
| 2011/0173281 A1 | 7/2011 | Smith |
| 2011/0184778 A1 | 7/2011 | Graepel et al. |
| 2011/0194679 A1 | 8/2011 | Patisaul et al. |
| 2011/0218860 A1 | 9/2011 | Barber |
| 2011/0225091 A1 | 9/2011 | Plastina et al. |
| 2011/0238575 A1 | 9/2011 | Nightengale et al. |
| 2011/0251951 A1 | 10/2011 | Kolkowitz et al. |
| 2011/0258118 A1 | 10/2011 | Ciurea |
| 2011/0282778 A1 | 11/2011 | Wright et al. |
| 2011/0288932 A1 | 11/2011 | Marks et al. |
| 2011/0302087 A1 | 12/2011 | Crooks |
| 2011/0302096 A1 | 12/2011 | Lowry |
| 2011/0307341 A1 | 12/2011 | Zohar et al. |
| 2011/0314557 A1 | 12/2011 | Marshall |
| 2012/0022883 A1 | 1/2012 | Morrison |
| 2012/0030083 A1 | 2/2012 | Newman et al. |
| 2012/0030757 A1 | 2/2012 | Baikalov et al. |
| 2012/0030771 A1 | 2/2012 | Pierson et al. |
| 2012/0036042 A1 | 2/2012 | Graylin et al. |
| 2012/0041841 A1 | 2/2012 | Hu et al. |
| 2012/0042361 A1 | 2/2012 | Wong et al. |
| 2012/0054136 A1 | 3/2012 | Maulik |
| 2012/0054847 A1 | 3/2012 | Schultz et al. |
| 2012/0084203 A1 | 4/2012 | Mehew et al. |
| 2012/0084860 A1 | 4/2012 | Cao et al. |
| 2012/0094639 A1 | 4/2012 | Carlson et al. |
| 2012/0101939 A1 | 4/2012 | Kasower |
| 2012/0150742 A1 | 6/2012 | Poon et al. |
| 2012/0150750 A1 | 6/2012 | Law et al. |
| 2012/0157062 A1 | 6/2012 | Kim et al. |
| 2012/0158586 A1 | 6/2012 | Ganti et al. |
| 2012/0166533 A1 | 6/2012 | Rubinstein et al. |
| 2012/0173465 A1 | 7/2012 | Hore et al. |
| 2012/0179558 A1 | 7/2012 | Fischer |
| 2012/0197981 A1 | 8/2012 | Chan |
| 2012/0204262 A1 | 8/2012 | Thomas et al. |
| 2012/0215896 A1 | 8/2012 | Johannsen |
| 2012/0216282 A1 | 8/2012 | Pappu et al. |
| 2012/0221470 A1 | 8/2012 | Lyon |
| 2012/0222111 A1 | 8/2012 | Oliver et al. |
| 2012/0233665 A1 | 9/2012 | Ranganathan et al. |
| 2012/0239553 A1 | 9/2012 | Gonen et al. |
| 2012/0239574 A1 | 9/2012 | Smith et al. |
| 2012/0239774 A1 | 9/2012 | Tola et al. |
| 2012/0278127 A1 | 11/2012 | Kirakosyan et al. |
| 2012/0295580 A1 | 11/2012 | Corner |
| 2012/0297380 A1 | 11/2012 | Colbert et al. |
| 2012/0311162 A1 | 12/2012 | Paulsen et al. |
| 2012/0323788 A1 | 12/2012 | Keresman et al. |
| 2012/0323836 A1 | 12/2012 | Wright et al. |
| 2012/0330787 A1 | 12/2012 | Hanson et al. |
| 2013/0006743 A1 | 1/2013 | Moore et al. |
| 2013/0018789 A1 | 1/2013 | Kaufmann |
| 2013/0018791 A1 | 1/2013 | Mendicino et al. |
| 2013/0024300 A1 | 1/2013 | Choudhuri et al. |
| 2013/0036304 A1 | 2/2013 | Lin et al. |
| 2013/0040603 A1 | 2/2013 | Stahlberg et al. |
| 2013/0042298 A1 | 2/2013 | Plaza Fonseca et al. |
| 2013/0055388 A1 | 2/2013 | Thomas et al. |
| 2013/0073463 A1 | 3/2013 | Dimmick et al. |
| 2013/0073473 A1 | 3/2013 | Heath |
| 2013/0080327 A1 | 3/2013 | Baldrick et al. |
| 2013/0085841 A1 | 4/2013 | Singleton et al. |
| 2013/0097673 A1 | 4/2013 | Meehan et al. |
| 2013/0097701 A1 | 4/2013 | Moyle et al. |
| 2013/0103482 A1 | 4/2013 | Song et al. |
| 2013/0103629 A1 | 4/2013 | Vaiciulis et al. |
| 2013/0110637 A1 | 5/2013 | Bott |
| 2013/0111592 A1 | 5/2013 | Zhu et al. |
| 2013/0117832 A1 | 5/2013 | Gandhi |
| 2013/0144539 A1 | 6/2013 | Allen et al. |
| 2013/0148525 A1 | 6/2013 | Cuadra Sanchez et al. |
| 2013/0159195 A1 | 6/2013 | Kirillin et al. |
| 2013/0185764 A1 | 7/2013 | Krstić et al. |
| 2013/0197998 A1 | 8/2013 | Buhrmann et al. |
| 2013/0198066 A1 | 8/2013 | Wall et al. |
| 2013/0204793 A1 | 8/2013 | Kerridge et al. |
| 2013/0226717 A1 | 8/2013 | Ahluwalia et al. |
| 2013/0253965 A1 | 9/2013 | Joseph |

(56) References Cited

U.S. PATENT DOCUMENTS

| | | |
|---|---|---|
| 2013/0273879 A1 | 10/2013 | Eisen et al. |
| 2013/0290119 A1 | 10/2013 | Howe et al. |
| 2013/0339186 A1 | 12/2013 | French |
| 2014/0032902 A1 | 1/2014 | Agrawal et al. |
| 2014/0114821 A1 | 4/2014 | Yoshioka et al. |
| 2014/0120864 A1 | 5/2014 | Manolarakis et al. |
| 2014/0122343 A1 | 5/2014 | Einav et al. |
| 2014/0148197 A1 | 5/2014 | Shields |
| 2014/0197950 A1 | 7/2014 | Shupp et al. |
| 2014/0258125 A1 | 9/2014 | Gerber et al. |
| 2014/0289867 A1 | 9/2014 | Bukai |
| 2014/0361926 A1 | 12/2014 | Eisen et al. |
| 2015/0026027 A1 | 1/2015 | Priess et al. |
| 2015/0046989 A1 | 2/2015 | Oberheide et al. |
| 2015/0088980 A1 | 3/2015 | Lakes et al. |
| 2015/0106270 A1 | 4/2015 | Burrell et al. |
| 2015/0127825 A1 | 5/2015 | Johannsen |
| 2015/0161207 A1 | 6/2015 | Li et al. |
| 2015/0186901 A1 | 7/2015 | Miltonberger |
| 2015/0188897 A1 | 7/2015 | Grigorovici et al. |
| 2015/0193769 A1 | 7/2015 | Barber |
| 2015/0193821 A1 | 7/2015 | Izumori et al. |
| 2015/0205978 A1 | 7/2015 | Eisen et al. |
| 2015/0242861 A9 | 8/2015 | Baldassano |
| 2015/0254658 A1 | 9/2015 | Bondesen et al. |
| 2015/0294316 A1 | 10/2015 | Eisen |
| 2015/0350856 A1 | 12/2015 | Circosta et al. |
| 2016/0019546 A1 | 1/2016 | Eisen |
| 2016/0021084 A1 | 1/2016 | Eisen |
| 2016/0034954 A1 | 2/2016 | Tollinger et al. |
| 2016/0036782 A1 | 2/2016 | Jeffrey et al. |
| 2016/0125461 A1 | 5/2016 | Sivaramakrishnan et al. |
| 2016/0203487 A1 | 7/2016 | Eisen |
| 2016/0246581 A1 | 8/2016 | Jimenez et al. |
| 2016/0321701 A1 | 11/2016 | Artman et al. |
| 2017/0039571 A1 | 2/2017 | Eisen |
| 2018/0089459 A1 | 3/2018 | Eisen et al. |
| 2018/0108029 A1 | 4/2018 | Sinha et al. |
| 2018/0121915 A1 | 5/2018 | Britton et al. |
| 2018/0262478 A1 | 9/2018 | Eisen |
| 2018/0322500 A1 | 11/2018 | Eisen |
| 2019/0028472 A1 | 1/2019 | Eisen |
| 2019/0066192 A1 | 2/2019 | Eisen |
| 2019/0340642 A1 | 11/2019 | Barber |
| 2019/0356659 A1 | 11/2019 | Eisen et al. |
| 2019/0370859 A1 | 12/2019 | Traasdahl et al. |
| 2020/0005315 A1 | 1/2020 | Eisen |
| 2020/0013064 A1 | 1/2020 | Eisen |
| 2020/0092287 A1 | 3/2020 | Cano et al. |
| 2020/0218763 A1 | 7/2020 | Barber |
| 2020/0219173 A1 | 7/2020 | Eisen |
| 2020/0226186 A1 | 7/2020 | Liodden et al. |
| 2020/0294086 A1 | 9/2020 | Traasdahl et al. |
| 2020/0380162 A1 | 12/2020 | Eisen et al. |

FOREIGN PATENT DOCUMENTS

| | | | |
|---|---|---|---|
| EP | 645692 A1 * | 3/1995 | ............ G06F 3/023 |
| EP | 0 923 039 | 6/1999 | |
| EP | 1 067 792 | 1/2001 | |
| EP | 1 209 935 | 5/2002 | |
| EP | 1 256 911 | 11/2002 | |
| EP | 1 201 070 B1 | 6/2006 | |
| EP | 1 703 382 | 9/2006 | |
| EP | 1 197 032 B1 | 8/2007 | |
| EP | 2 154 891 | 2/2010 | |
| EP | 3 583 758 | 4/2021 | |
| GB | 2 491 101 | 11/2012 | |
| GB | 2 492 604 | 1/2013 | |
| JP | 05-257602 | 10/1993 | |
| JP | 2000-020467 | 1/2000 | |
| JP | 2000-099250 | 4/2000 | |
| JP | 2000099250 A * | 4/2000 | ............ G06F 3/023 |
| JP | 2000-137755 | 5/2000 | |
| JP | 2000-242582 | 9/2000 | |
| JP | 2000-276281 | 10/2000 | |
| JP | 2002-007697 | 1/2002 | |
| JP | 2002-297869 | 10/2002 | |
| JP | 2003-050910 | 2/2003 | |
| JP | 2005-063216 | 3/2005 | |
| JP | 2005-115644 | 4/2005 | |
| JP | 2005-135431 | 5/2005 | |
| JP | 2006-004333 | 1/2006 | |
| JP | 2007-272520 | 10/2007 | |
| JP | 2007-282249 | 10/2007 | |
| JP | 2008-022298 | 1/2008 | |
| JP | 2008-065363 | 3/2008 | |
| JP | 2008-171315 | 7/2008 | |
| JP | 2008-535124 | 8/2008 | |
| JP | 2008-243008 | 10/2008 | |
| JP | 2008-257434 | 10/2008 | |
| JP | 2008-269229 | 11/2008 | |
| JP | 4202314 | 12/2008 | |
| JP | 2009-048538 | 3/2009 | |
| JP | 2009-122880 | 6/2009 | |
| JP | 2009-175984 | 8/2009 | |
| JP | 2010-020728 | 1/2010 | |
| JP | 2010-061254 | 3/2010 | |
| JP | 2010-122955 | 6/2010 | |
| JP | 2010-122956 | 6/2010 | |
| JP | 2010-225040 | 10/2010 | |
| JP | 2010-250664 | 11/2010 | |
| JP | 2011-065531 | 3/2011 | |
| JP | 2011-134252 | 7/2011 | |
| JP | 2011-159307 | 8/2011 | |
| JP | 2012-234503 | 11/2012 | |
| JP | 5191376 | 5/2013 | |
| JP | 5216932 | 6/2013 | |
| KR | 10-1999-0015738 | 3/1999 | |
| KR | 10-0645983 | 11/2006 | |
| KR | 10-2008-0044558 | 5/2008 | |
| KR | 10-2009-0051977 | 9/2009 | |
| KR | 10-2010-0085888 | 7/2010 | |
| WO | WO 96/041488 | 12/1996 | |
| WO | WO 97/003410 | 1/1997 | |
| WO | WO-9723816 A1 * | 7/1997 | ............ G06F 3/023 |
| WO | WO 99/050775 | 10/1999 | |
| WO | WO 01/011450 | 2/2001 | |
| WO | WO 01/033520 | 5/2001 | |
| WO | WO 01/095550 | 12/2001 | |
| WO | WO 01/097134 | 12/2001 | |
| WO | WO 02/001462 | 1/2002 | |
| WO | WO 02/071176 | 9/2002 | |
| WO | WO 02/091226 | 11/2002 | |
| WO | WO 03/017155 | 2/2003 | |
| WO | WO 03/025868 | 3/2003 | |
| WO | WO 03/075197 A2 | 9/2003 | |
| WO | WO 03/075197 A3 | 12/2003 | |
| WO | WO 02/037219 A9 | 5/2004 | |
| WO | WO 2004/038997 | 5/2004 | |
| WO | WO 2005/038818 | 4/2005 | |
| WO | WO 2005/099166 | 10/2005 | |
| WO | WO 2006/135367 | 12/2006 | |
| WO | WO-2006135367 A2 * | 12/2006 | ........... G06F 21/316 |
| WO | WO 2007/001394 | 1/2007 | |
| WO | WO 2007/045818 | 4/2007 | |
| WO | WO 2007/072238 | 6/2007 | |
| WO | WO 2007/075573 | 7/2007 | |
| WO | WO 2008/029828 | 3/2008 | |
| WO | WO 2008/054849 | 5/2008 | |
| WO | WO 2009/132148 | 10/2009 | |
| WO | WO 2012/054646 | 4/2012 | |
| WO | WO 2012/061801 | 5/2012 | |
| WO | WO 2012/142121 | 10/2012 | |
| WO | WO 2012/142584 | 10/2012 | |
| WO | WO 2013/006538 | 1/2013 | |
| WO | WO 2013/142722 | 9/2013 | |
| WO | WO 2014/022813 | 2/2014 | |
| WO | WO 2014/078569 | 5/2014 | |

(56) References Cited

FOREIGN PATENT DOCUMENTS

| WO | WO 2018/129373 | 7/2018 |
|---|---|---|
| WO | WO 2018/151822 | 8/2018 |

OTHER PUBLICATIONS

Official Communication in European Patent Application No. 19181057.1, dated Sep. 17, 2019.
U.S. Appl. No. 10/612,375, 9,412,123, Keystroke Analysis, filed Jul. 1, 2003.
U.S. Appl. No. 15/204,654, 2017/0039571, Keystroke Analysis, filed Jul. 7, 2016.
Banking Services Newsletter, "Keeping You Up-to-Date on Banking Developments Throughout the UC System", University of California, Office of the President, Banking Services Group, Newsletter 1, Dec. 2005, p. 1.
Bharosa, "Bharosa Authenticator", http://www.bharosa.com/authenticator.html, Jan. 18, 2007, pp. 3.
Bharosa, "Bharosa Announces Online Authentication Solution to Counter Check 21-Based Fraud", http://www.bharosa.com/news/PR-110705.html, Jan. 18, 2007, pp. 2.
Darlin, Damon, "Opening the Door on the Credit Report and Throwing Away the Lock", http://www.nytimes.com/2006/03/18/business/yourmoney/18money.html, The New York Times, Saturday Mar. 18, 2006, pp. 2.
Derfler, Jr. et al, "How Networks Work", Millennium Edition, Que Corporation, Indianapolis, IN, Sep. 2000, pp. 230.
Gralla, Preston, "How The Internet Works", Millennium Edition, Que Corporation, Indianapolis, IN, Aug. 1999, pp. 329.
Gueye et al., "Constraint-Based Geolocation of Internet Hosts", ACM Internet Measurement Conference 2004, Oct. 25-27, 2004, Taormina, Sicily, Italy, vol. 14, No. 6, pp. 288-293.
"ISO 8583", Wikipedia, http://en.wikipedia.org/wiki/ISO_8583, dated Apr. 13, 2015 in 14 pages.
Kohno et al., "Remote Physical Device Fingerprinting", Proceedings of 2005 IEEE Symposium on Security and Privacy, May 8-11, 2005, Oakland, CA, pp. 211-225.
Manavoglu et al., "Probabilistic User Behavior Models", ICDM, Third IEEE International Conference on Data Mining, Nov. 19-22, 2003, pp. 203-210.
Techweb, "Wells Fargo Intros Anti-Theft Alerts", http://www.techweb.com/wire/166404177, Aug. 1, 2005, pp. 1.
The Knightmare, "Secrets of a Super Hacker", Loompanics Unlimited, Port Townsend, Washington, 1994, pp. 233.
"UPIC Marketing Guide—The Clearing House", http://www.upic.com/infofiles/UPIC_Marketing_Guide.pdf, as printed Dec. 19, 2006. pp. 1-16.
White, Ron, "How Computers Work", Millennium Edition, Que Corporation, Indianapolis, IN, Sep. 1999, pp. 284.
Official Communication in European Patent Application No. 05818903.6, dated Dec. 23, 2011.
Official Communication in European Patent Application No. 05818903.6, dated Mar. 18, 2014.
Official Communication in European Patent Application No. 05818903.6, dated Jul. 18, 2017.
International Search Report and Written Opinion for Application No. PCT/US2005/035532, dated Oct. 29, 2007.
International Preliminary Report on Patentability and Written Opinion for Application No. PCT/US2005/035532, dated Jan. 9, 2008.
Official Communication in European Patent Application No. 6845722.5, dated Mar. 13, 2009.
Official Communication in European Patent Application No. 8159110.9, dated Oct. 27, 2008.
Official Communication in European Patent Application No. 8159110.9, dated Mar. 22, 2010.
International Search Report and Written Opinion for Application No. PCT/US2006/048251, dated Feb. 26, 2008.
International Preliminary Report on Patentability and Written Opinion for Application No. PCT/US2006/048251, dated Jun. 18, 2008.
International Search Report and Written Opinion for Application No. PCT/US2007/065776, dated Jul. 3, 2008.
International Preliminary Report on Patentability and Written Opinion for Application No. PCT/US2007/065776, dated Sep. 30, 2008.
International Search Report and Written Opinion received in PCT Application No. PCT/US2005/020750, dated Jun. 13, 2008.
International Preliminary Report on Patentability and Written Opinion received in PCT Application No. PCT/US2005/020750, dated Jul. 1, 2008.
Official Communication in European Patent Application No. 08165224.0, dated Nov. 15, 2010.
Supplementary European Search Report for Application No. EP09735653, dated Dec. 16, 2011.
Official Communication for Application No. EP09735653, dated Jan. 4, 2013.
Summons to Attend Oral Proceedings received in European Application No. EP09735653, dated Oct. 7, 2016.
International Search Report and Written Opinion for Application No. PCT/US2009/041462, dated Dec. 1, 2009.
International Preliminary Report on Patentability and Written Opinion for Application No. PCT/US2009/041462, dated Nov. 4, 2010.
International Search Report and Written Opinion for Application No. PCT/US2011/056948, dated Apr. 18, 2012.
International Preliminary Report on Patentability in Application No. PCT/US2011/056948, dated May 2, 2013.
International Search Report and Written Opinion for Application No. PCT/US2013/033357, dated Jul. 10, 2013.
International Preliminary Report on Patentability in Application No. PCT/US2013/033357, dated Sep. 23, 2014.
International Search Report and Written Opinion for Application No. PCT/US2013/053495, dated Nov. 22, 2013.
International Preliminary Report on Patentability in Application No. PCT/US2013/053495, dated Feb. 3, 2015.
International Search Report and Written Opinion for Application No. PCT/US2013/070146, dated Mar. 3, 2014.
International Preliminary Report on Patentability in Application No. PCT/US2013/070146, dated May 28, 2015.
U.S. Appl. No. 61/324,312, dated Apr. 15, 2010 in 15 pages.
Official Communication in European Patent Application No. 19189189.4, dated Jan. 21, 2020.
Official Communication in European Patent Application No. 19189189.4, dated Nov. 19, 2020.
Summons to Attend Oral Proceedings received in European Application No. EP08159110, dated Jul. 23, 2020.

* cited by examiner

KEYSTROKE ANALYSIS

FIELD OF THE INVENTION

This invention concerns keystroke analysis, and in particular the use and analysis of keystrokes made on a keyboard-like data input device for detecting the erroneous or fraudulent entry of data. This application is a continuation application of U.S. application Ser. No. 15/204,654, filed on Jul. 7, 2016, entitled KEYSTROKE ANALYSIS, which is a continuation application of U.S. application Ser. No. 10/612,375, filed on Jul. 1, 2003, now U.S. Pat. No. 9,412,123, entitled KEYSTROKE ANALYSIS, where all above-cited applications are incorporated herein by reference in their entirety.

BACKGROUND OF THE INVENTION

Online transactions frequently require a user to enter information using a keyboard or a keyboard-like device (hereinafter collectively referred to as "a keyboard"). An "online transaction" is any communication between an electronic communication location, for example, a website and a user or consumer. The communication can take a variety of forms, e.g., the entry by the consumer of information in a website's survey; an agreement to buy merchandise; a contest, sending a message via e-mail, etc. that is executed in whole or in part via a keyboard and electronically. A more specific example of an online transaction is an agreement to pay in exchange for the shipment of a product, i.e., a consumer's purchase. As used herein, a "product" can be goods and/or services. Another specific example of an online transaction is the completion of an online survey, e.g., the completion of a form provided through a web site over the Internet. The survey may be desired by the web site owner for a variety of reasons, e.g., marketing analysis, generation of a mailing list, effectiveness of marketing/advertising, etc. Sometimes, these surveys offer "rewards" or prizes to one, some or all of the entrants. Yet another example of an online transaction is the entry of personal profile information by a user using an interface device, like a keyboard, provided by a web site over the Internet. A keyboard can include any device used to enter alphanumeric information by a user.

Online transactions include the entry of information through an online form. The form can have certain fields that the user is required to complete. Examples of fields are a name field; an address field; a credit card number field; a credit card expiration date field; etc. When a user enters a survey, a contest, or is registered for a purchase by completing a form, the user may be presumed by a vendor or other online authority to be a legitimate party with which to engage in an online transaction.

A legitimate user engaged in an honest online transaction typically enters information into the required fields by pressing keys at varying locations on the keyboard that correspond to letters and/or numbers corresponding to the user's true name, address, telephone number, credit card number, etc. As used herein, a "keystroke" is a character produced by activating (e.g., depressing) a key of the keyboard. For example, the keystroke "a" results from pressing the "a" key on a keyboard in lowercase mode, while the keystroke "A" results from pressing the "a" key on a keyboard in the uppercase mode (ordinarily achieved by simultaneously depressing the "Shift" key and the "a" key of the keyboard). The "location of a keystroke" is the location of the key that is depressed or activated to generate the keystroke. For example, the location of the keystroke "a" corresponds to the location of the "a" key on a standard keyboard, which is typically next to the "s" key and under the "q" key on a standard QWERTY keyboard. Of course, the present invention can be adopted for other keyboard configurations. Likewise, the distance between keystrokes is deemed to be the shortest distance in keys, whether, vertical, horizontal or diagonal, between the keys that are depressed or activated to produce the keystrokes. This can be measured in any suitable fashion, such as the actual number of intervening spaces between keys or the actual linear distance in millimeters between keys, etc. For example, on a QWERTY keyboard, the distance between the "a" and "s" keystrokes is deemed 1 as there is a single intervening space between those keys. Thus, the distance between the "a" and the "d" keystrokes is deemed, for the purpose of the present invention, 2 keys, since there are two intervening key spaces between those individual keys, etc. The distance between an "f" and a "t" or between an "h" and a "t" is deemed 1, again, because there is one space between those keys of the standard QWERTY keyboard. Alternatively, the linear distance between the "a" and the "s" keystrokes on a QWERTY keyboard is about 2 centimeters; the distance between the "a" and the "d" keystrokes is about 4 centimeters (two spaces); etc. Of course, these concepts can apply to any keyboard, not just a QWERTY keyboard. For example, a cell phone has a keyboard, denominated a keypad with keys that correspond to numbers and letters. On a cell phone keypad, the keystrokes "a", "b" and "c" all correspond to the "2" key, so the distance between those keystrokes is deemed zero. The distance between the "a" and "t" keystrokes can be 2 keys since the number of spaces between those two keys on a keypad numbers 2 or in linear dimension, about 0.8 centimeters (0.4 centimeters per space), etc.

A fraudulent user engaged in a dishonest online transaction is typically interested in filling in the fields required on an online form as quickly as possible. This allows access to information, provides for a fraudulent purchase, or multiple (and thus contrary to the rules) entries into a contest. Since the fraudulent user is not concerned with the accuracy of the information entered into the fields, the keystrokes need not be at substantially different locations on the keyboard.

DETAILED DESCRIPTION OF THE DRAWING AND PREFERRED EMBODIMENT

An embodiment of the present invention can detect the entry of information that is likely to be part of a fraudulent online transaction based upon the relative locations of the keystrokes used to enter the information into one or more fields. For example, many online forms for contests only require that a field in a form not be left blank to accept an entry. A fraudulent user (a "fraudster") realizes this, and often seeks to enter keystrokes as quickly as possible, without regard to their meaning. The quick entry of this fraudulent information may allow the fraudster to submit multiple contest entries, for example. The present invention seeks to determine the presence of fraudulent online transaction. To enter information quickly, then, a fraudulent user or fraudster will often enter data into the field(s) by placing one hand on the keyboard and randomly entering keystrokes that are located near to each other. An embodiment of the present invention capitalizes on this fact to detect actually or potentially fraudulent data entered by a user.

In an embodiment of the present invention, a numerical value is assigned to each keystroke. The numerical value of a second or succeeding keystroke is based upon the distance of the second or succeeding keystroke from the first or preceding keystroke, preferably the immediately previously entered keystroke. An arbitrary value can be assigned to the first keystroke. For example, if the first keystroke is "a", then it can be assigned an integer value, such as 1. An integer is any of the positive and negative whole numbers and zero, i.e., [ . . . −2, −1, 0, 1, 2, . . . ] The second keystroke can be assigned a value equal to the number of keyspaces between the first and second keystrokes. Thus, if the second keystroke is a "d", then the second keystroke can be assigned a value ("score") of 2, because on the QWERTY keyboard, the "d" key is two key spaces away from the "a" key, i.e., a single key "s" is between the "a" key and the "d" key with that "s" key having a space on each of its sides to separate it from the "a" and "d" keys. If the third keystroke is also a "d", it will be assigned a score of 0, because it is 0 keystrokes or spaces away from the second keystroke, which was also a "d." If the fourth keystroke depressed by the user is an "s," it will be assigned a score of 1, because the "s" key is one key space separated from the "d" key. If the fifth keystroke is an "e", it will be assigned a value or score of 1, because it is one diagonal key space separated from the "s" key. This is how the present invention preferably assigns values to each keystroke entered by a user.

Of course, other methods of assigning values or scores to second and successive keystrokes can be employed without departing from the scope of the present invention. For example, a percentage difference from two keys next to each other can be employed, by capitalizing on the diagonal distance between depressed keys. For example, although an "a" and "s" are one key space apart from one another and the "a" and "w" are also one key space apart, the inventor further contemplates assigning a value of 1 to the "a" to "s" keyspace between the keys and a weighted value of 1.25, for example, for the "a" to "w" keyspace between those keys, because they appear on different rows of the keyboard. Other mannrs of valuing second and successive keystrokes from the first and following keystrokes are contemplated and all within the scope of the present invention.

The scores of all keystrokes used to enter information in a field of a form of an online transaction can be summed in accordance with the present invention. One or more keystrokes is called a "string". The sum of the keystroke scores of a string is called a "string score". The number of keystrokes or keys depressed by the user in a string is called its "length." For the example above, the string "addse" has a string score of 1+2+0+1+1=5, and a length of 5 (since 5 separate keystrokes were depressed to form the string). A string score is "normalized" when its string score is divided by its length. So, in the example, the normalized string score for the string "addse" above is 5/5=1. This value for the normalized string score is typical for strings made of keystrokes entered by a fraudster. That is, strings made of essentially randomly entered keystrokes that are relatively close to each other have string scores that are approximately equal to the lengths of the strings. Another example is the string "ddddddddd", which has a normalized string score of 0.1, since the first keystroke is assigned a value or score of 1 and all of the subsequent keystrokes are assigned the value or score of 0. The sum of the keystrokes, the string score, is then 1+0+0+0+0+0+0+0+0 or 1. The length of the string is 10. The normalized string score is 1 divided by 10 or 10/1=0.1. In other words, such nonsense or fraudster type strings typically have normalized string scores about equal to, or less than, one.

On the other hand, strings that are made from keystrokes that correspond to real information typically have larger score sums than their lengths, because successive keystrokes are often located at more mutually distant locations on the keyboard. In other words, the normalized string score for legitimate strings is often greater than 1. For example, the name ELLEN has a string score of 1+6+0+6+4=17 (based on the number of spaces between the keys), a length of 5 (based on the number of keys depressed to form the string) and thus a normalized string score of 17/5=3.4.

In accordance with an embodiment of the present invention, a string having a normalized string score sum less than or equal to about 1 can indicate an entry by a fraudulent user, while a score substantially above 1 can indicate a legitimate entry. In practice, it has been found that, generally, a normalized string score sum that is less than or about equal to 1.25 can indicate a likely fraudulent entry; a normalized string score sum greater than 1.25 yet less than or equal to about 1.5 can indicate a moderate likelihood (risk) of fraud; and a normalized string score sum greater than about 2 can indicate a smaller likelihood of a fraudulent or mistakenly entry into the data field. Thus, entries into fields can be categorized into high, medium and low risk levels of fraud or mistake.

The normalized string scores of two or more strings belonging to, say, the same online transaction can be aggregated to generate a high, medium or low level of risk that applies to the entire transaction. For example, the normalized string scores of some or all of a group of strings (e.g., the entries in a transaction (name, address, etc.)) can be summed to obtain a transactional score, and when divided by the number of entries (fields) in the sum to obtain a normalized transactional score. If this result is less than or equal to about 1, then the online transaction is likely a high risk of being fraudulent; if it is greater than 2, it is likely a low risk of being fraudulent; and, if otherwise, it can be "flagged" for further investigation. In this way, the entire online transaction can be rejected if a high risk level is shown in accordance with an embodiment of the present invention; accepted if a low risk is indicated; or the transaction can be flagged for further study if a moderate level of risk is detected. Likelihood (risk) of fraud can be determined in terms of a percentage measurement (e.g., 25% probability of fraud, 60% probability of fraud, etc.); risk levels (e.g., low, medium, high; acceptable, unacceptable; suspicious, etc.); or any other suitable way. These risk determinations can be associated with a single string or sets of strings and stored.

Strings entered in the course of an online transaction can advantageously be stored in a database. The strings associated with a single transaction can be stored as a single record. The string score and transactional score can be associated with the record corresponding to the strings and transactions to which the scores pertain. Thus, a risk level can be associated with a specific record. For example, a credit card number that is entered along with several strings with normalized scores equal to about 1 can be placed into a database of highly suspect information. The credit card number can be reported as possibly stolen, or other transactions that use that credit card number can be temporarily canceled or blocked until the legitimate holder of the credit card or the credit card company is first notified.

A single field with a normalized value of about 1 may not indicate fraud. For example, the legitimate name FRED can have a string score of 1+1+1+1=4, a string length of 4 and thus a normalized score of 4/4 or 1. Thus, the present invention encompasses setting various thresholds, as appropriate, for classifying a user as potentially suspect. For another example, a user can be classified as suspect when two or more; three or more; four or more, etc. fields have a normalized string scores that fall between 0.5 and 1.5 (a gap of 1.0); or between 0.75 and 1.25 (gap of 0.5); or 0.9 and 1.1 (a gap of 0.2); etc. This can advantageously "tune" the sensitivity of the present invention. For example, requiring more fields to have normalized scores about equal to 1 for a user to be categorized as "suspect" can diminish the sensitivity of the fraud detection in accordance with an embodiment of the present invention. Narrowing the gap between the lower and upper normalized score values within which a normalized score must fall to be a suspect value can have the same effect. Requiring fewer fields to be determined as suspicious and/or widening the value of the gap can increase the method's sensitivity. Thus, an embodiment of the present invention can be advantageously adjusted to take into account the particular needs and policies of the authority seeking to detect fraud. An authority that is eager to avoid false positives (i.e., one where there is little financial risk of loss if the entry is fraudulent) can adjust the tolerance to a lower sensitivity, while an authority that wishes to rigorously prevent fraud because of the loss of large amounts of goods and/or money has a greater tolerance for false positives and may adjust the parameters to increase sensitivity. A "false positive" occurs when a legitimate user is incorrectly classified as a fraudulent user.

The present invention produces good results regardless of the starting position of the hand that types the information, and for either the right or left hand. For example, a user places his left hand in the conventional position for a QWERTY-style keyboard, with his left index finger resting on the "f" key, his second finger on the "d" key, his ring finger on the "s" key and his pinky on the "a" key, etc. Suppose the user is a fraudster, so he types a random string of letters convenient to the placement of his left hand, e.g., "wessf". If the first keystroke is assigned an arbitrary value of 1, and if the distance between keystrokes is measured in spaces between keys, then the string score is 1+1+1+0+2 or 5. Since there are five keystrokes, the normalized string score is 5/5 or 1. If the fraudster types the same pattern but with a different hand position, the string score and normalized string score will be the same. For example, if the fraudster uses his right hand in the position where his right index finger rests on the "j" key, the second finger on the "k", and the right hand pinky on the ";" key, the same typing pattern produces the string "uijjl". This string also has a string score of 5 and a normalized string score of 1. So, an embodiment of the present invention advantageously detects key entries that may be fraudulent regardless of the position of the hand on the keyboard or which hand is used for the entry.

Figure 1:
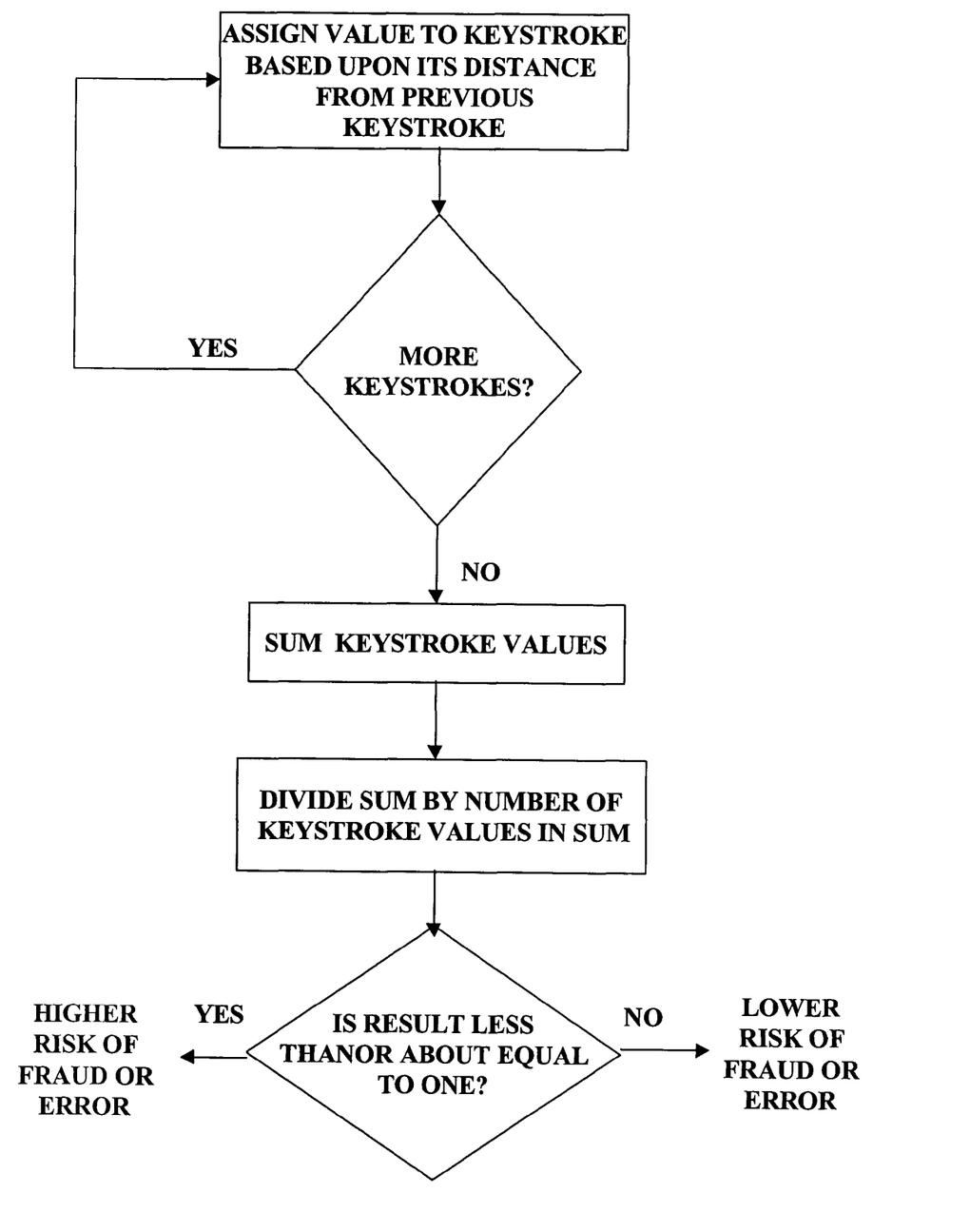
FIG. 1 is a flowchart showing the method in accordance with an embodiment of the present invention.

FIG. 1 is a flowchart in accordance with an embodiment of the present invention. A value is assigned to a keystroke based upon its distance from the previous keystroke (201). This can be repeated for any number of keystrokes (202). The values of the keystrokes are summed (203) and then normalized by dividing the sum or string score by the length of the string, i.e., the number of keystrokes (204). The resulting normalized sum indicates a higher likelihood of fraud or error if it is about equal to or less than one, and a lower likelihood of fraud or error if it is larger than one, as described above.

The present invention can advantageously take into account the fact that the use of the shift key for capitalization may indicate a reduced likelihood of fraud or error. A fraudster who simply wants to enter keystrokes simply to complete an entry or field of a form typically does not bother depressing the shift key for a single keystroke, while a legitimate user may wish to capitalize the first letter of a name, use a shift character (e.g., the "!" on the "1" key, the "@" on the "2" key, etc.). A keystroke made while the shift key is depressed (or locked) is denoted shift+keystroke, e.g., shift+a. A keystroke made while the shift key is depressed or locked can also be denoted by the character it produces. For example, shift+a=A, shift+1=!, etc. A shift+keystroke can be called a "shifted keystroke."

An embodiment of the present invention takes the shift key into account by adding an extra amount to the value of a shifted keystroke. This extra amount is added to the value assigned to a keystroke based upon its distance from the previous keystroke. For example, in a string, "d" as the first letter or keystroke is assigned a value of 1, and since "a" is two key spaces away from "d", i.e., separated by a single key with spaces on its sides, "a" is assigned a value of 2, just as before described. Likewise, the next keystroke "q" is assigned a value of 1, because it is one key space distance from "a". Thus, the string value for "daq" is 1+2+1=4. The string length is 3. The normalized string value is 4/3=1.33. For the string "Daq" (i.e., shift+d,a, and q) an extra value of 1 is added to the shifted keystroke "D" because the shift key was used. The string score for Daq is therefore 2+2+1=5, the string length remains as 3 and the normalized string score is 5/3=1.67. Since the normalized score is greater for "Daq" than "daq," it appropriately indicates that the risk of fraud or error for "Daq" is smaller than that for "daq." The enhanced value added to the score of a keystroke because it is shifted can be an integer (e.g., 1, 2, 3, etc.) or any other real number (e.g., 1.43, 4.6. etc.).

The scoring rule(s) for keystrokes involving the shift key can be further refined by taking into account a locked shift key, or multiple shifted keystrokes that may not indicate a lesser likelihood of fraud or error than a string score based exclusively on distance from the previous keystroke. For example, if all of the keystrokes in a string are shifted, e.g., "DAQ," then no additional value is added to the distance-based keystroke values. So "DAQ" can have the same string score as "daq." Likewise, indications that a shift key is being randomly depressed can also be taken into account. A rule can be implemented such that no additional value is added to a shifted keystroke if at least one (or at least two, two of three, or at least three, etc.) contiguous keystrokes in the string are also shifted. In other words, an extra value can be added to the "D" in "Daq," but no extra value will be added to either "D" or "Q" in the string "DaQ," or "DAQ" because a rule is implemented that no enhanced value will be attributed to any shifted key that is part of a contiguous set of two of three or three or more consecutive shifted keys in the string. In another example, the "D" and "A" have the value 1 added to each of the D and the A for totaling keystroke scores in the string DAqui, but the shifted keys D and A and Q will not have any value added to them in the string DAQui, because a rule is implemented that no enhanced value will be added to any shifted keystroke that is part of a contiguous set of three or more shifted keystrokes. Other rules can be envisioned that take into account the shift key. For example, a string with more than a predetermined fraction of its keystrokes shifted may be valued without adding enhanced values to the shifted keystrokes; a string that includes more than a predetermined number of shifted keystrokes or a percentage of the overall keystrokes may be valued without adding enhanced values to the shifted keystrokes; etc.

An embodiment of the present invention can be embodied in software adapted to be executed by a processor. A processor may be coupled to a memory, storing keystroke fraud instructions that are adapted to be executed by the processor to perform the method in accordance with an embodiment of the present invention. Although the instructions are termed "fraud instructions," they can also detect the risk of an erroneous entry of keystrokes. The processor can be a general purpose microprocessor, such as the Pentium IV processor manufactured by the Intel Corporation of Santa Clara, Calif., or an Application Specific Integrated Circuit (ASIC) that embodies at least part of the method in accordance with an embodiment of the present invention in hardware and/or firmware. An example of an ASIC is a digital signal processor. Memory can be any device that can store computer-readable information, such as Random Access Memory (RAM); Read Only Memory (ROM); a hard disk; a CD-ROM; flash memory; etc. Keystroke fraud instructions can also be carried on a medium, which can include memory and/or a telecommunications channel.

In one embodiment of the present invention, the keystroke fraud instructions are executed on a client machine to which the entries made on a remote keyboard are coupled. Upon execution, the instructions examine strings of keystrokes entered by a user and sets a "flag" indicating a likelihood of fraud or mistake associated with a string or set of strings. In another embodiment, a string or set of strings is analyzed by the processor at the user's end and only after it is determined as not likely to be fraudulent are the field entries sent to the web site. The keystroke fraud server sends a message to the web site server indicating a likelihood of fraud associated with the string or set of strings. In yet another embodiment, numerous strings are stored on a medium (e.g., a database on a hard disk; carried over a telecommunications channel and stored on a memory; etc.) and are analyzed by a computer having a processor executing the keystroke fraud instructions. This can occur shortly after or some time after the strings have been entered by one or more users. The strings and sets of strings are analyzed, and the likelihood of fraud associated with each string and/or set of strings can be recorded.

The above description is meant to illustrate, and not to limit, the scope of the present invention. One skilled in the art will readily appreciate that other embodiments of the present invention can be used, instead of those described above. For example, the distance between keys can be characterized in different ways than the shortest number of jumps needed to get from one key to another or the linear distance. A value should be assigned to a keystroke such that the absolute magnitude of the value is larger when the space, linear or keyboard distance between the given keystroke and a previously entered keystroke such that the greater distance corresponds to a greater value for the keystroke, and smaller when the distance is smaller; summing the values of several keystrokes; and normalizing the resulting sum to that longer set of keystrokes with the same relative positions as smaller sets of keystrokes produce about the same normalized value. Also, the value assigned to a keystroke need not be based upon the distance of the keystroke from an immediately previous keystroke. A value of a keystroke can also be based upon the distance of a subsequently typed keystroke from a predetermined positioned keystroke, e.g., all distances are determined from the third keystroke, ignoring the first two. Further, the value assigned to a keystroke need not always be based upon the distance of the keystroke from a consecutive (preceding or following) keystroke. In some cases, the value can be based upon the distance from the keystroke to another keystroke entered some keystrokes prior or subsequent. Further, scores of keystrokes can be manipulated such that a larger normalized string score indicates a lower likelihood of fraud than a smaller normalized string score. For example, a normalized string score can be inverted.

The present invention can also detect entries that have been entered in an erroneous fashion, and transactions that contain erroneous entries. Also, the present invention can be used to detect and ignore keyboard entries made accidentally to a wireless device while it is carried in a user's pocket or purse. When another object near the wireless device presses on the keypad, nearby keys can often be depressed, sometimes repeatedly. A number can unintentionally be dialed on the wireless device, or data can be inadvertently entered. The present invention can advantageously detect entries of keystrokes near to each other, and selectively ignore them. For example, a rule can be implemented to the effect that a string of nearby keystrokes should be ignored, unless they appear on an exception list stored at or accessible to the wireless device. In another embodiment, the rule can be to ignore a string of nearby keystrokes that do not begin with one or more predetermined strings, such as an access digit (such as "1") and a recognized, stored or preauthorized area code.

These and other embodiments would be understood by one of ordinary skill in the art to be encompassed by the present invention.

What is claimed is:

1. A computer-implemented method for authenticating an online session, the method comprising:

establishing, by a computer processor of a fraud detection server, a first online session for a first online transaction associated with a first user, wherein the first online transaction involves a first user input field;

receiving, by the computer processor of the fraud detection server via the first user input field, a first data string comprising alpha-numeric characters;

calculating, by the computer processor of the fraud detection server, a transaction risk score for the first data string based on a determination that the alpha-numeric characters are entered with a shift key;

determining, by the computer processor of the fraud detection server that the first online transaction is potentially fraudulent based at least in part on the transaction risk score;

establishing, by a computer processor of a fraud detection server, a second online session for a second online transaction associated with a second user, wherein the second online transaction involves a second user input field;

receiving, by the computer processor of the fraud detection server, a second field data string via the second user input field;

comparing, by the computer processor of the fraud detection server, the second data string to the first data string;

based on the comparison, determining, by the computer processor of the fraud detection server, that the second online transaction is potentially fraudulent; and in response to the determination that the second online transaction is potentially fraudulent, providing, by the computer processor of the fraud detection server, an indication to the first user or the second user that the second transaction is potentially fraudulent.

2. The computer-implemented method of claim 1, wherein the transaction risk score is adjusted to reflect less risk in response to a determination that the alpha-numeric characters are entered with the shift key.

3. The computer-implemented method of claim 1, further comprising resuming the first online transaction in response to a determination that the first online transaction is not fraudulent.

4. The computer-implemented method of claim 1, wherein the transaction risk score for the first data string is calculated by:
   determining a score for each of the alpha-numeric characters of the first data string;
   generating a data string score by summing the scores of the alpha-numeric characters;
   determining a count for the alpha-numeric characters;
   dividing the data string score by the count of the alpha-numeric characters to obtain a normalized data string score;
   comparing the normalized data string score to a predetermined value for normalized data string scores to generate a field risk value for the first data string; and
   determining the transaction risk score based on the field risk value.

5. The computer-implemented method of claim 1, wherein the indication comprises a likelihood of fraud.

6. The computer-implemented method of claim 1, wherein determining, based on the transaction risk score, whether the online transaction is potentially fraudulent comprises:
   accessing a threshold score; and
   comparing the transaction risk score with the threshold score, wherein the online transaction is potentially fraudulent where the transaction score exceeds the threshold score.

7. The computer-implemented method of claim 1, wherein the indication is provided to the first user and the second user.

8. The computer-implemented method of claim 1, wherein the determining that the second online transaction is potentially fraudulent comprises determining that the second field data string matches the first field data string.

9. A system for authenticating an online session, the system comprising:
   a fraud detection server system comprising a computer processor configured to execute computer instructions; and
   a memory in electronic communication with the computer processor, said memory is configured to store the computer instructions causing the processor of the fraud detection server system to:
      establish a first online session for a first online transaction associated with a first user, wherein the first online transaction involves a first user input field;
      receive a first data string via the first user input field, the first data string comprising alpha-numeric characters;
      calculate a transaction risk score for the first data string based on a determination of whether the alpha-numeric characters are entered with a shift key;
      determine that the first online transaction is potentially fraudulent based at least in part on the transaction risk score;
      establish a second online session for a second online transaction associated with a second user, wherein the second online transaction involves a second user input field;
      receive a second data string via the second user input field;
      compare the second data string to the first data string;
      based on the comparison, determine that the second online transaction is potentially fraudulent; and
      in response to the determination that the second online transaction is potentially fraudulent, provide, by the computer processor of the fraud detection server, an indication to the first user or the second user that the second transaction is potentially fraudulent.

10. The system of claim 9, wherein the transaction risk score is adjusted to reflect less risk in response to a determination that the alpha-numeric characters are entered with the shift key.

11. The system of claim 9, wherein the computer instructions further cause the computer processor of the fraud detection server system to resume the first online transaction in response to a determination that the first online transaction is not fraudulent.

12. The system of claim 9, wherein, to calculate the transaction risk score for the first data string, the computer instructions further cause the computer processor of the fraud detection server system to:
   determine a score for each of the alpha-numeric characters of the first data string;
   generate a data string score by summing the scores of the alpha-numeric characters;
   determine a count for the alpha-numeric characters;
   divide the data string score by the count of the alpha-numeric characters to obtain a normalized data string score; and
   compare the normalized data string score to a predetermined value for normalized data string scores to generate a risk value for the field data string; and determine the transaction risk score based on the risk value.

13. The system of claim 9, wherein the indication comprises a likelihood of fraud.

14. The system of claim 9, wherein, to determine whether the online transaction is potentially fraudulent, the computer instructions further cause the computer processor of the fraud detection server system to:
   access a threshold score; and
   compare the transaction risk score with the threshold score, wherein the online transaction is potentially fraudulent where the transaction score exceeds the threshold score.

15. The system of claim 9, wherein the indication is provided to the first user and the second user.

16. The system of claim 9, wherein the determination that the second online transaction is potentially fraudulent comprises is based at least on a determination that the second field data string matches the first field data string.

17. Non-transitory computer storage having stored thereon a computer program, the computer program including executable instructions that instruct a computer processor to at least:
   establish a first online session for a first online transaction associated with a first user, wherein the first online transaction involves a first user input field;
   receive, via the first user input field, a first data string comprising alpha-numeric characters;
   calculate a transaction risk score for the first data string based on a determination of whether the alpha-numeric characters are entered with a shift key;
   determine that the first online transaction is potentially fraudulent based at least in part on the transaction risk score;

establish a second online session for a second online transaction associated with a second user, wherein the second online transaction involves a second user input field;

receive a second data string via the second user input field;

compare the second data string to the first data string;

based on the comparison, determine that the second online transaction is potentially fraudulent; and in response to the determination that the second online transaction is potentially fraudulent, provide, by the computer processor of the fraud detection server, an indication to the first user or the second user.

18. The non-transitory computer storage of claim 17, wherein the transaction risk score is adjusted to reflect less risk in response to a determination that the alpha-numeric characters are entered with the shift key.

19. The non-transitory computer storage of claim 17, wherein, to calculate the transaction risk score for the first field data string, the computer instructions further cause the computer processor of the fraud detection server system to:

determine a score for each of the alpha-numeric characters of the first data string;

generate a field data string score by summing the scores of the alpha-numeric characters;

determine a count for the alpha-numeric characters;

divide the field data string score by the count of the alpha-numeric characters to obtain a normalized field data string score;

compare the normalized field data string score to a predetermined value for normalized data string scores to generate a field risk value for the first field data string; and determine the transaction risk score based on the field risk value.

20. The non-transitory computer storage of claim 17, wherein, to determine whether the online transaction is potentially fraudulent, the computer instructions further cause the computer processor of the fraud detection server system to:

access a threshold score; and compare the transaction risk score with the threshold score, wherein the online transaction is potentially fraudulent where the transaction score exceeds the threshold score.

* * * * *